(12) United States Patent
Springer et al.

(10) Patent No.: US 12,164,678 B2
(45) Date of Patent: Dec. 10, 2024

(54) ENFORCING CONSENT REQUIREMENTS FOR SHARING VIRTUAL MEETING RECORDINGS

(71) Applicant: Zoom Video Communications, Inc., San Jose, CA (US)

(72) Inventors: Shane Paul Springer, Manchester, MI (US); Alexander Waibel, Sammamish, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 273 days.

(21) Appl. No.: 17/733,134

(22) Filed: Apr. 29, 2022

(65) Prior Publication Data

US 2023/0351060 A1 Nov. 2, 2023

(51) Int. Cl.
  *G06F 21/84* (2013.01)
  *G06F 21/62* (2013.01)
  *G06T 5/70* (2024.01)
  *G10L 17/02* (2013.01)
  *H04L 12/18* (2006.01)

(52) U.S. Cl.
  CPC .......... *G06F 21/84* (2013.01); *G06F 21/6245* (2013.01); *G06T 5/70* (2024.01); *G10L 17/02* (2013.01); *H04L 12/1822* (2013.01); *H04L 12/1831* (2013.01)

(58) Field of Classification Search
  CPC . G06F 21/6245; G06F 21/84; H04L 12/1822; H04L 12/1831; H04L 51/212; G10L 17/02; G10L 21/003; G10L 15/26; G06T 5/70

USPC .......................................................... 726/26
See application file for complete search history.

(56) References Cited

U.S. PATENT DOCUMENTS

| | | | | |
|---|---|---|---|---|
| 5,471,318 A | * | 11/1995 | Ahuja | H04M 3/567 |
| | | | | 709/204 |
| 9,344,396 B2 | * | 5/2016 | Geppert | G06F 3/04842 |
| 10,540,971 B2 | * | 1/2020 | Kumar | H04L 12/1827 |
| 10,742,695 B1 | * | 8/2020 | Brown | H04L 51/02 |
| 11,539,542 B2 | * | 12/2022 | Tiwari | H04N 7/15 |
| 2016/0255126 A1 | * | 9/2016 | Sarris | H04L 65/1096 |
| | | | | 348/14.08 |
| 2022/0270055 A1 | * | 8/2022 | Mitchell | H04L 12/1822 |
| 2022/0415317 A1 | * | 12/2022 | Flores | G06F 40/169 |
| 2022/0417049 A1 | * | 12/2022 | Decrop | H04L 12/1818 |

(Continued)

*Primary Examiner* — Amare F Tabor
(74) *Attorney, Agent, or Firm* — Kilpatrick Townsend & Stockton LLP

(57) ABSTRACT

Systems and methods for enforcing consent requirements for sharing virtual meeting recordings are provided herein. In an example, a method may include receiving, from a first client device, a recording privacy request associated with a virtual meeting, and receiving, from a second client device, a request to share a recording of the virtual meeting with one or more recipients. The method may also include modifying, by a video conference provider, at least one of a first audio stream or a first video stream associated with the first client device in the recording based on the recording privacy request, and generating, by the video conference provider, a privatized recording based on the modification of at least one of the first audio stream or the first video stream. The method may also include transmitting, by the video conference provider, the privatized recording to the one or more recipients.

20 Claims, 10 Drawing Sheets

(56) References Cited

U.S. PATENT DOCUMENTS

| | | | |
|---|---|---|---|
| 2023/0155850 A1* | 2/2023 | Yalawarmath | H04L 65/403 709/204 |
| 2023/0245687 A1* | 8/2023 | Bhupati | G11B 27/036 386/282 |

* cited by examiner

ENFORCING CONSENT REQUIREMENTS FOR SHARING VIRTUAL MEETING RECORDINGS

FIELD

The present application generally relates to videoconferences and more particularly relates to systems and methods for enforcing consent requirements for sharing virtual meeting recordings.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
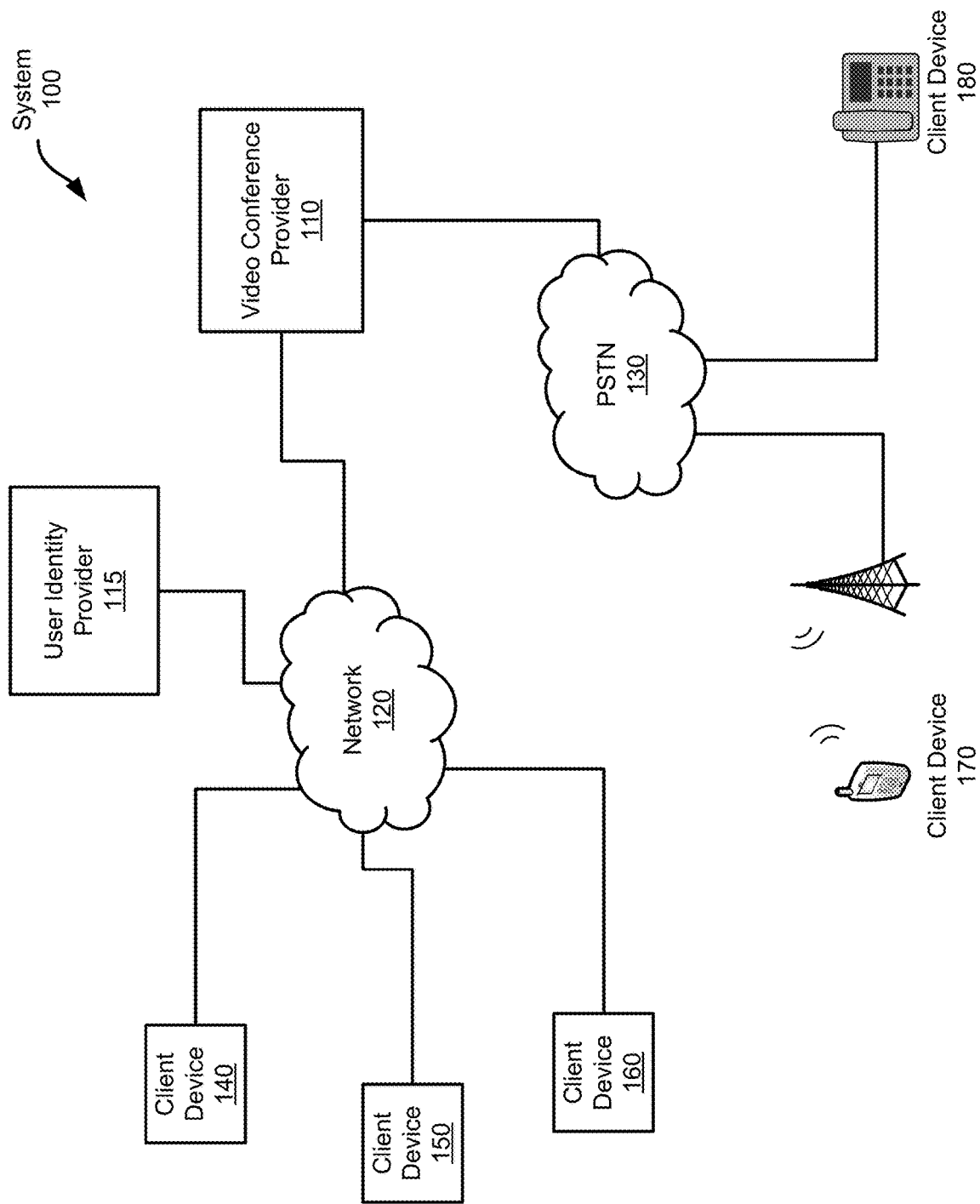
FIGS. 1, 2, and 3 show example systems for enforcing consent requirements for sharing virtual meeting recordings, according to an embodiment herein.

Examples are described herein in the context of systems and methods for enforcing consent requirements for sharing virtual meeting recordings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, virtual events, and webinars, all of which are referred to herein as "virtual meetings." While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

As the popularity of virtual meetings to replace conventional, in-person meetings, continues to rise, so too does the increase in privacy concerns for participants while in the virtual space. While participating in virtual meetings, participants generally have little control over their privacy, especially if a virtual meeting is being recorded. Conventionally, if a participant wants to join a virtual meeting that is being recorded, the participant must either consent to being recorded, both audio streams and video streams, or leave the virtual meeting. While, in some circumstances, a participant may join a recorded meeting without video and choose to not speak during the meeting, the participant's personal information regarding his or her attendance is still associated with the recording. Moreover, attending the meeting in this manner diminishes the virtual meeting for the participant and leads to a less meaningful experience. Accordingly, there is a need for allowing participants to attend a recorded meeting while maintaining control over their privacy.

To provide virtual meeting participants with control over their recording privacy during a recorded meeting, systems and methods are provided herein for enforcing consent requirements for sharing virtual meeting recordings. The systems and methods provided herein provide examples of recording privacy functionality that allows a participant of a recorded virtual meeting control over who the meeting recording is shared with and what level or degree of his or her personal information is shared in the meeting recording. For example, a participant may modify his or her audio stream to mask his or her voice or speech pattern, or the participant may modify his or her video stream to blur his or her face in a virtual meeting recording when the recording is shared with a first group of recipients (e.g., recipients inside of his or her organization). In other examples, the participant may completely remove his or her audio stream and video stream from the meeting recording when the recording is shared with a second group of recipients (e.g., recipients outside of his or her organization).

By providing the participant control over the degree to which personally-identifiable information is revealed in a shared recording, the participant may fully engage in a recorded virtual meeting without concern about sharing personal information with individuals outside of the virtual meeting or unknown individuals after the meeting. The recording privacy functionality, as provided herein, can provide participants the confidence to fully engage with a virtual meeting without concerns of personal and private information being recorded and shared outside the context of the virtual meeting.

This illustrative example is given to introduce the reader to the general subject matter discussed herein and the disclosure is not limited to this example. The following sections describe various additional non-limiting examples and examples of systems and methods for prevention of sharing of recordings of people without consent (e.g., recording privacy functionality) during virtual meetings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services users of the client devices 140-160 and may authenticate user identities of one or more users to the video conference provider 110. In this example, the user identity provider 115 is operated by a different entity than the video conference provider 110, though in some examples, they may be the same entity.

Figure 2:
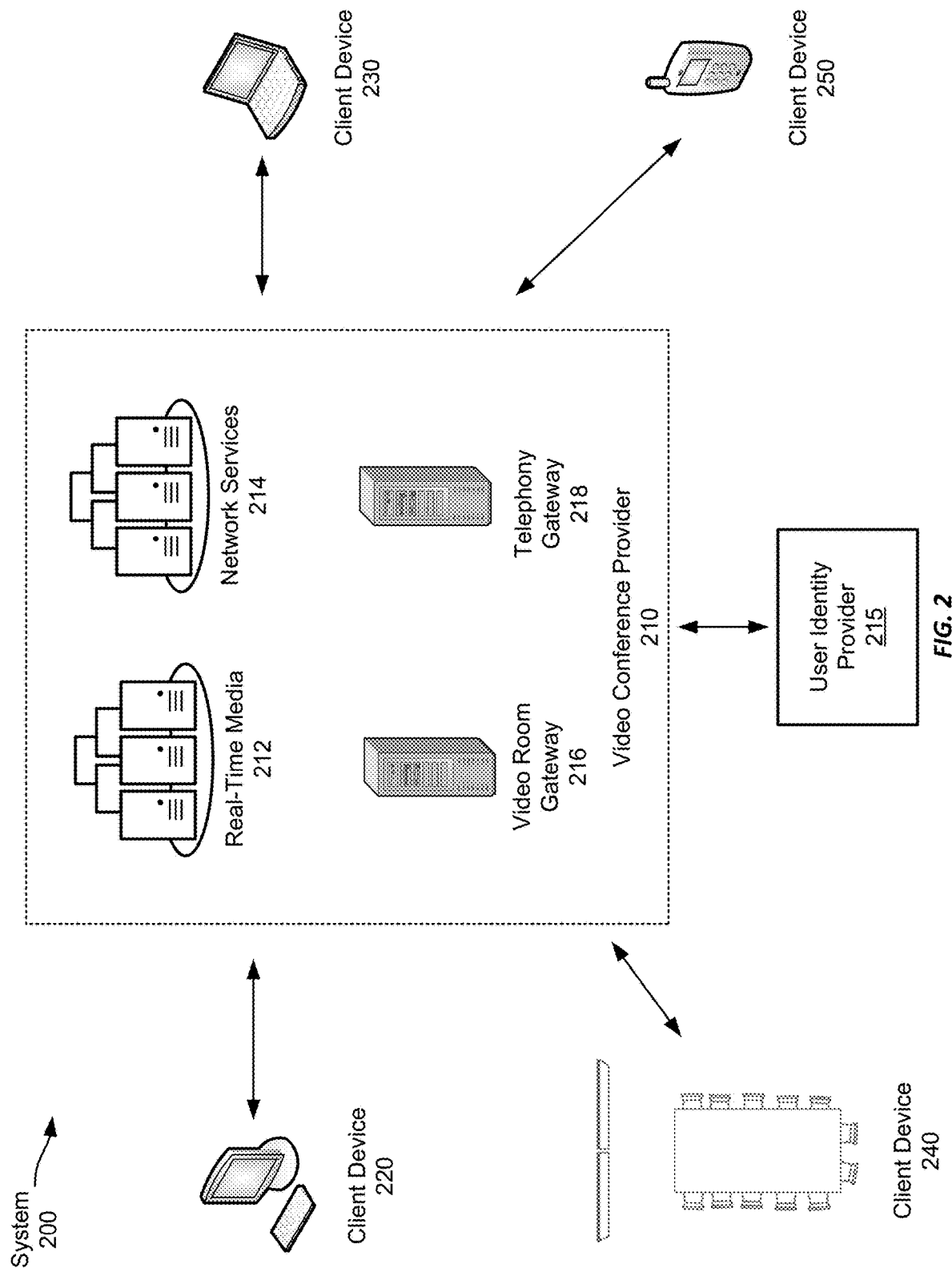

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
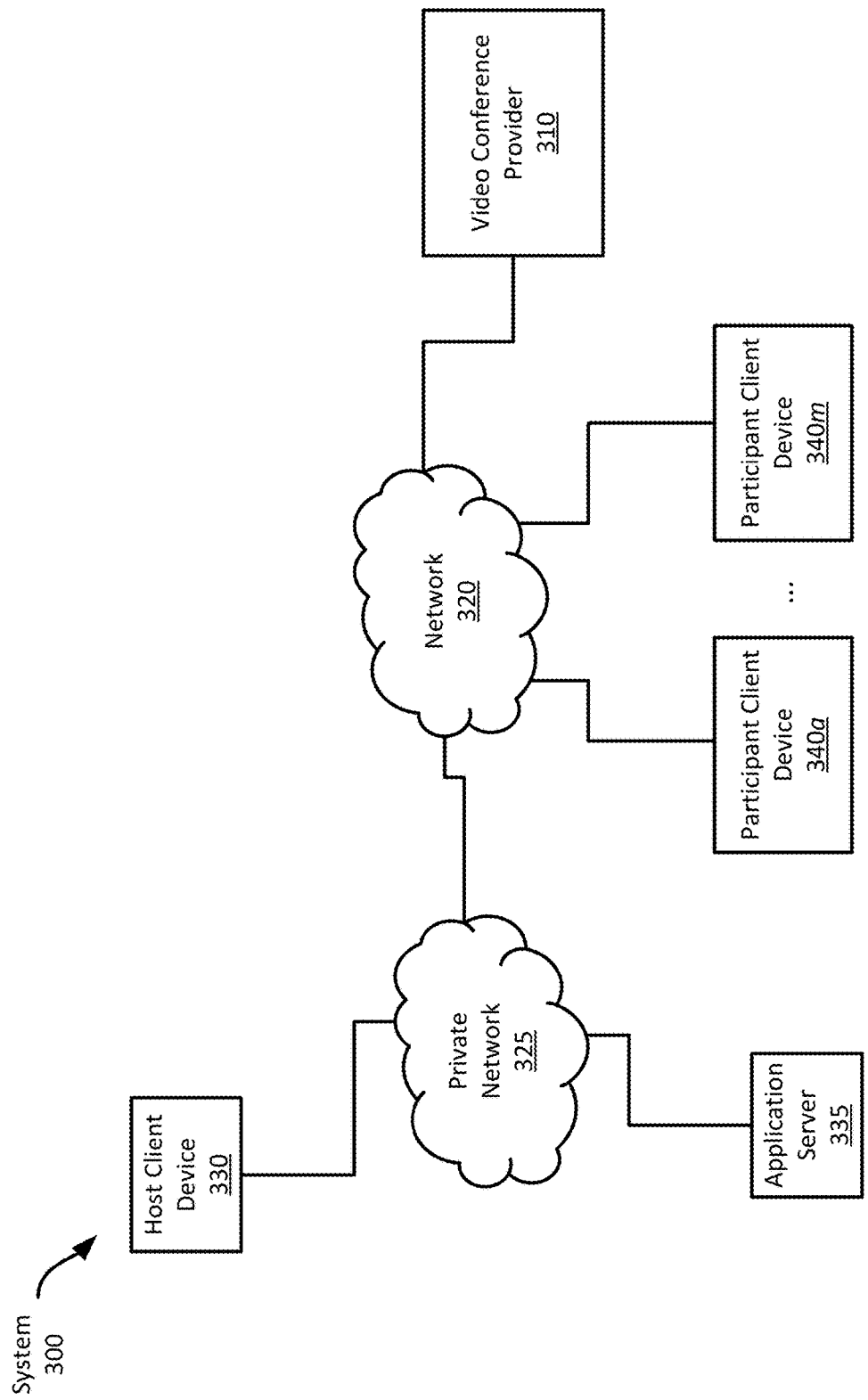

Referring now to FIG. 3, FIG. 3 shows an example system 300 for providing recording privacy functionality during a virtual meeting. In this example, a video conference provider 310 provides video conference services to multiple different client devices 330 and 340a-m, generally as described above with respect to FIGS. 1 and 2. In this example, the client devices 330 and 340a-m participate in a meeting hosted by the video conference provider 310. Client devices 340a-m connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting ("meeting") at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the meeting or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

During the meeting one of the participant client devices 340a-m or the host client device 330 may request to record the meeting. The request to record the meeting may be transmitted to the video conference provider 310. In some embodiments, the video conference provider 310 may prompt the non-requesting client devices with a notification that the meeting is going to be recorded. For example, if the host client device 330 requests to record the meeting, the participant client devices 340a-m may receive a notification that the meeting is going to be recorded. Once the recording request is accepted, the video conference provider 310 may record the audio and video streams from all of the client devices, 340a-m and 330, until the recording is terminated or the meeting is ended.

As noted above, under the conventional virtual meeting recording architectures, participants need to either accept being recorded or leave the meeting. Moreover, participants have no control over his or her presence (e.g., audio or video streams) in the recording once the meeting has terminated and the recording is generated. That is, presently, once a meeting recording is generated, the participant has no control over his or her audio streams in the recording, who the recording is shared with, or for how long into the future the recording can be shared.

To provide virtual meeting participants the ability to join and participate in a recorded meeting without concern for who the recording will be shared with or control over his or her audio and video streams within the recording when the recording is shared, the example system 300 enables recording privacy functionality to allow participants to control the extent, at least to some degree, to which the recording incorporates their audio or video streams. The recording privacy functionality may be automatically performed based on a participant's preferences and/or the meeting settings. In other embodiments, a participant may be able to edit a meeting recording after the meeting terminates or prior to the recording being shared, based on the context of the sharing. For example, in some embodiments, participants recorded within a meeting recording may receive a prompt notifying them that the meeting recording is to be shared with a first recipient group. Based on this notification, the participants may be provided with the option to modify their audio or video streams within the meeting recording prior to sharing of the meeting recording with the first recipient group. For example, participants may be provided with an allotted amount of time to modify the meeting recording according to their recording privacy preferences before the meeting recording is shared. Once the allotted amount of time is up, the meeting recording may be shared. In some embodiments, the meeting recording may be shared without being revised per a participant's recording privacy preferences if the participant did not provide his or her recording privacy preferences during the allotted time. In other cases, a meeting recording may be automatically modified based on a participant's recording privacy preferences. Recording privacy preferences are discussed in greater detail with respect to FIG. 5.

The recording privacy functionality may provide virtual meeting participants control over their personal privacy when it comes to recordings. For example, a participant corresponding to the participant client device 340a may want to participate in a virtual meeting; however, the participant may be uncomfortable with the meeting recording being shared outside of the participants of the meeting. The meeting, however, is being recorded for training and educational purposes. Under conventional video conferencing structures, the participant would be required to leave the meeting if he or she did not want to be recorded or have personally identifiable information present in the recording, regardless of who the recording is shared with. The recording privacy functionality, however, provides the participant the ability to control what degree and how much of his or her private and personal information is present in the recording when the recording is shared. Moreover, the recording privacy functionality provides the participant control over who his or her audio or video streams are shared with and how much private and personal information is present based on the recipient of the recording.

As will be expanded on below, the participant may indicate, based on the identity of a recipient group, that he or she would like his or her voice obscured or modified in a way that it is not personally identifiable to the participant. Similarly, the participant may indicate, based on the identity of a recipient group, that he or she would like to obscure or modify his or her appearance to no longer be personally identifiable or recognizable as the participant. In other scenarios, the participant may indicate, based on the identity of the recipient group, that he or she would like his or her audio and/or video streams within the recording to be completely removed or their name or other user identifier to be obscured or removed from the recording. By allowing the participant to modify his or her appearance, voice, and/or presence in the recording based on the recipient(s), the participant can fully participate in the meeting without concern for who the recording is going to be shared with.

To invoke the recording privacy functionality, a participant may request recording privacy for a recording. For example, upon receiving a notification that the meeting is being recorded, the participant client device 340a may provide a recording privacy request. The recording privacy request may be transmitted from the participant client device 340a to the video conference provider 310. Once the video conference provider 310 receives the recording privacy request, the video conference provider 310 may tag the audio and video streams corresponding to the participant client device 340a as requesting recording privacy from the participant client device 340a. After the meeting terminates, the video conference provider 310 may provide a prompt to the participant client device 340a based on the recording privacy request. The prompt may provide to the participant client device 340a the various recording segments in which the participant ("Participant A") corresponding to the participant client device 340a is present. Presence of the participant client device 340a, as used herein, encompasses presence of the audio stream, the video stream, or both the audio and video streams from the participant client device 340a, or any reference to Participant A. For example, if another participant addresses Participant A during the meeting, the segment of the recording in which Participant A is addressed may be flagged. Identification of recording segments in which a participant is present is discussed in greater detail below with respect to FIG. 8.

It should be understood that in some embodiments, recording privacy functionality may include modification of the audio stream, of the video stream, or both the audio and video streams within the recording. In other embodiments, recording privacy functionality may also include modification of non-audio or video content. For example, participants may be able to request recording privacy for any chat messages, documents exchanged, or transcripts generated from the recorded meeting and the non-audio or video content may be similarly modified to remove personally identifiable information associated with the requesting participant. In some embodiments, modification of the audio stream and/or the video stream within the recording may include erasing or removing the audio stream and/or video stream completely from the recording.

In some embodiments, the other participants in the virtual meeting may be notified or informed when a participant privatizes a meeting recording. For example, when Participant A goes to share the meeting recording, Participant A may receive a notification that the audio and/or video streams from the participant client device 340b has been privatized for sharing. In some embodiments, the notification may provide detail to Participant A as to the privatization, such as, for example, the reason for the privatization (e.g., the selected recipients) or the extent to which the recording is privatized (e.g., the audio and video streams from the participant client device 340b are removed from the recording). In some embodiments, Participant A, as the sending participant, may be able to review the privatized recording to understand the content of the privatized recording prior to sending it to the recipient group.

Figure 4:
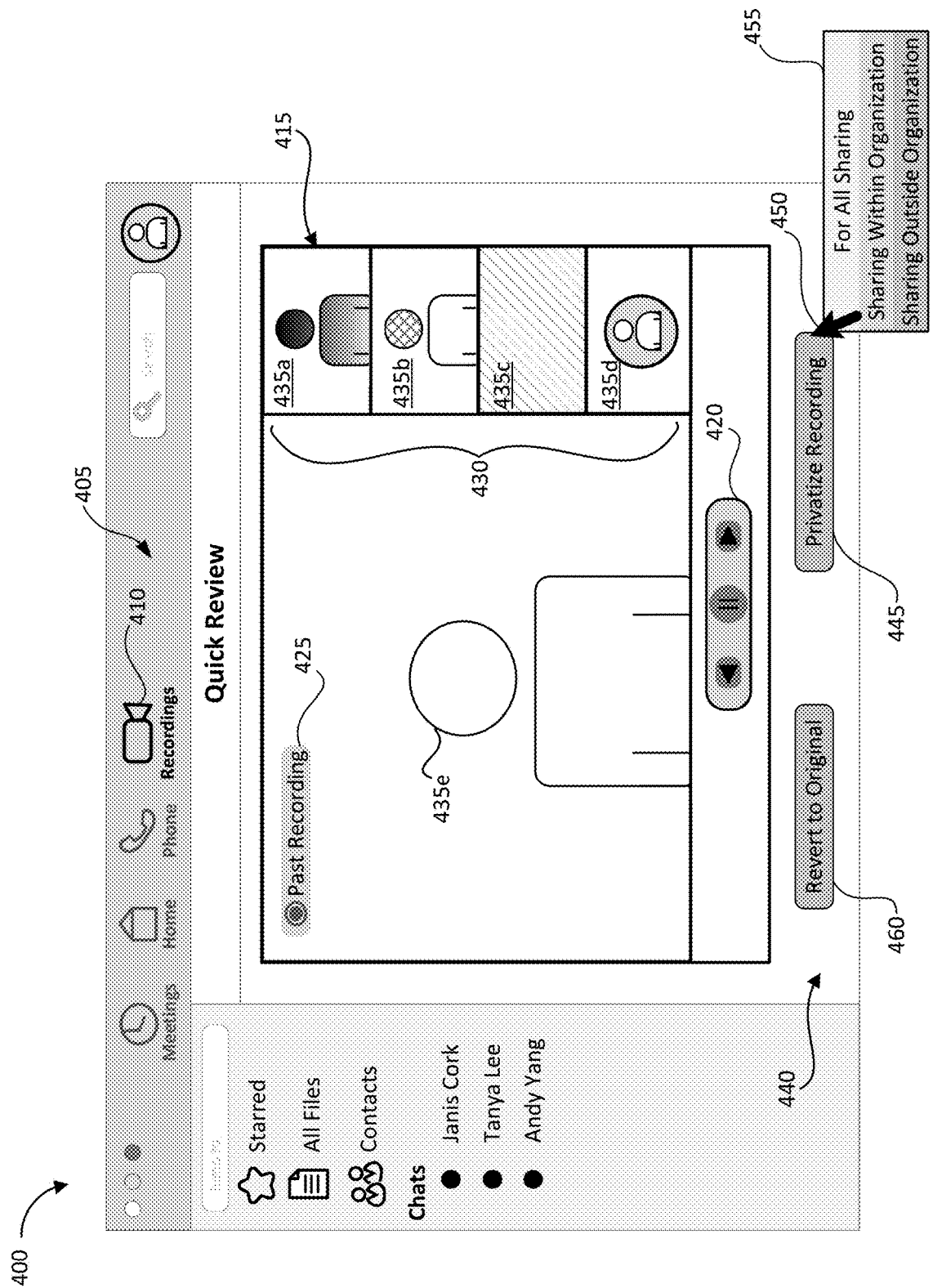
FIG. 4 shows a graphical user interface providing a recording of a virtual meeting, according to an embodiment herein.

Referring now to FIG. 4, a GUI 400 providing a recording of a virtual meeting is provided, according to an embodiment. The GUI 400 may be presented to a participant or a host during a virtual meeting. For example, upon termination of a meeting that is recorded, the participant may be provided with the GUI 400 for a quick review of the meeting recording to determine the level or degree to which recording privatization is desired. The following figures and related components, such as GUI 400 of FIG. 4, will be described with respect to the system shown in FIG. 3, however, any suitable system according to this disclosure may be employed, such as those described in FIGS. 1 and 2.

In some embodiments, a GUI 400 is viewable to a participant of the video conference on the participant's device. For example the GUI 400 may be viewable to participant A on the client device 340a. Presentation of the GUI 400 on the participant's device may be in response to the termination of the virtual meeting. To review the meeting recording, the participant may select a recordings selection 410 provided on a dashboard 405 of the GUI 400. The dashboard 405 may provide various functions that can be performed with respect to a video conference. Upon selection of the recordings selection 410, a display 415 of the meeting recording may be provided. The display 415 may provide the meeting recording. The participant may review the meeting recording using controls 420 to play the recording, fast forward, or reverse through the recording.

As shown, the display 415 may provide indication 425. The indication 425 may notify the participant that he or she is viewing a past meeting recording. The display 415 may also include a roster 430 of the participants 435a-e in the video conference. The roster 430 may include a recorded video stream of some or all of the participants 435a-e. In other embodiments, the roster 430 may include a picture, image, representation, avatar or a listing of some or all of the participants 435a-e who were present during the virtual meeting. When a participant joins the video conference, the joining participant is added to the roster 430.

The meeting recording provided in display 415 may include the video and audio streams that were exchanged between the participants 435a-e. A large portion of the display 415 may display the video stream of a currently speaking participant 435e according to a presently played segment of the recording. The audio stream from participant 435e may also be played along with the video stream. In some embodiments, when the recording segment includes more than one speaking participant, the display 415 may include two or more windows providing the video streams from the speaking participants.

The GUI 400 may also include a dashboard 440 containing one or more action selections for the recording. For example, to initiate recording privacy, the dashboard 440 may include a privatize recording selection 445. Upon reviewing the meeting recording in display 415, the participant may want to privatize the recording. To do so, the participant may select the privatize recording selection 445 with his or her cursor 450. In some embodiments, upon selection of the privatized recording selection 445, prompt 455 may be provided. The prompt 455 may allow the participant to specify for which recipients to privatize the recording. For example, if the participant selects "Sharing Outside Organization," then anytime the recording is shared with any recipient outside of the organization associated with the participant, the privatized recording will be sent to those recipients. In contrast, if the recording is shared with a recipient within the organization, then the recording, not privatized, may be shared with that recipient.

The prompt 455 also provides the options to privatize the recording for recipients within the organization, as well as privatize the recording for any recipient. That is, if the recording is shared with any recipient, then only the privatized recording is shared. It should be understood that prompt 455 provides a simplified illustration of various types of recipient groups for ease of discussion and any variety of recipient groups could be provided.

The GUI 400 may allow a participant to review the privatized recording prior to applying the recording privacy preferences. For example, after the participant selects the privatize recording selection 445, the participant may review the recording on the display 415 using the controls 420. If the participant desires to revert the privatized recording back to the original, non-privatized recording, then the participant may select the revert selection 460. The revert selection 460 may allow a participant to revert a privatized recording back to the original recording. In an example case, a participant may be reviewing a privatized recording a duration of time after the meeting and not remember why he or she privatized the recording. As such, the participant may select the revert selection 460 to review the original recording. It may be that at this later time, the participant is okay with the original, non-privatized recording. If so, the participant may update his or her recording privacy preferences for this recording to reflect such. In such an embodiment, both a privatized copy of the recording and a non-privatized copy of the recording may be stored, for example by the video conference provider 310 and/or the participant client device 340a. The copy of the recording (e.g., privatized vs. non-privatized) that is shared will depend on the participant's recording privacy preferences.

In some embodiments, the recording provided on display 415 may reflect the recording privacy preferences of other meeting participants. For example, the participant 435c may have selected to privatize his or her video stream to remove the video stream from the recording. As such, when the participant is reviewing the meeting recording, the video stream from the participant 435c may not be present in the recording. Similarly, the participant 435b may have indicated on his or her recording privacy preferences that he or she would like to have his or her video stream modified, by for example, blurring his or her face. As such, the recording provided in display 415 may provide the video stream for the participant 435b with his or her face blurred. In other embodiments, the recording provided on display 415 may be the original recording without reflecting the recording privacy preferences of the other meeting participants.

A participant may set his or her recording privacy preferences during review of a recording, prior or during a video conference, or set overall recording privacy preferences that apply to all meeting recordings. In other words, the recording privacy preferences may be determined on an individual basis—recording by recording—or they may be set generally to apply to any recording that is generated that includes the participant.

Figure 5:
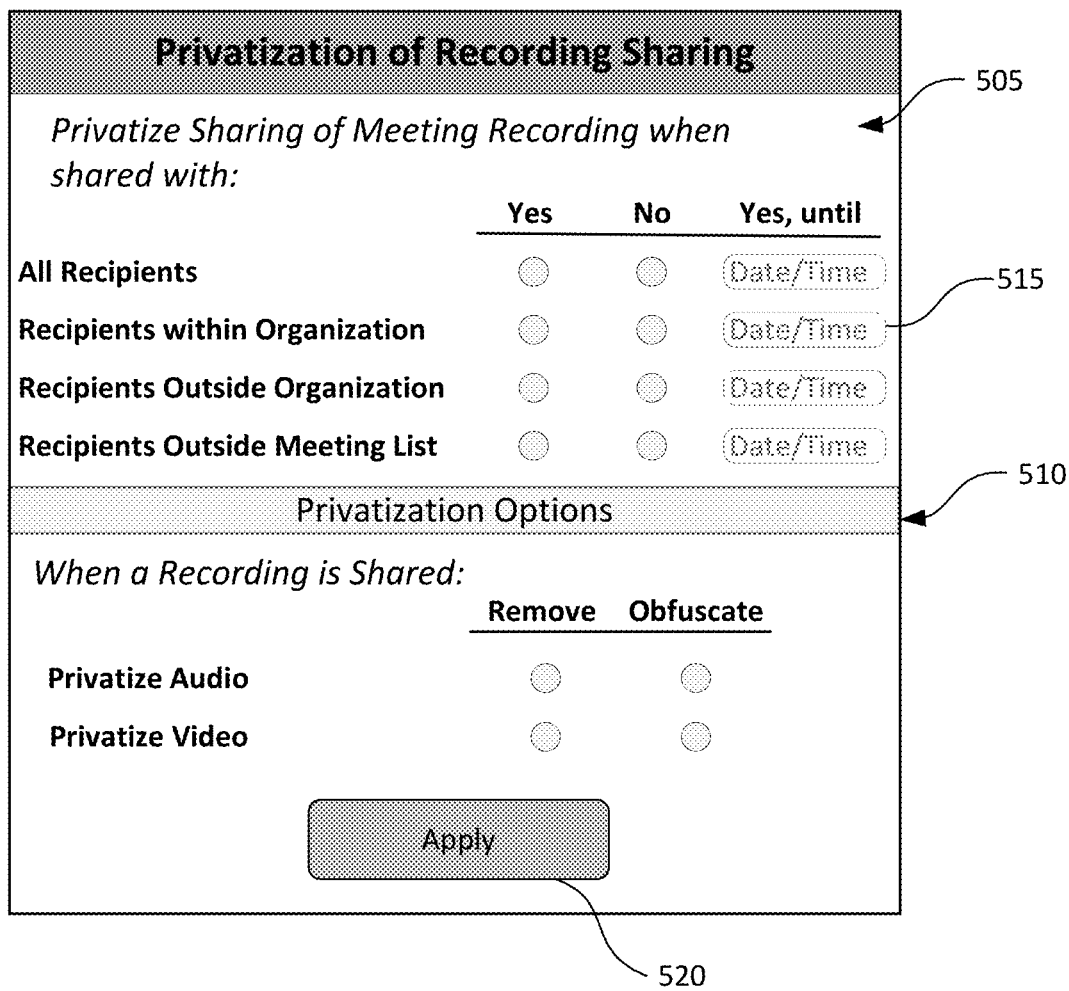
FIG. 5 illustrates a privatization of recording sharing prompt, according to an embodiment herein.

Referring now to FIG. 5, a recording privacy preferences prompt 500 is provided, according to an embodiment herein. The recording privacy preferences prompt 500 may be provided to a participant upon termination of a meeting that was recorded or a participant may select a past recording and be provided with the recording privacy preferences prompt 500 upon submitting a recording privacy request. This scenario is discussed in greater detail with respect to FIG. 8.

The recording privacy preferences prompt 500 may include a sharing pane 505. The sharing pane 505 may provide various options regarding which recipients require a privatized recording. For example, as shown, a participant may select that a meeting recording is privatized for all recipients. In other words, anytime the recording is prompted to be shared, the recording is privatized per the participant's recording privacy preferences to generate a privatized recording and only the privatized recording is shared with the recipient(s). In other embodiments, the participant may select a first recipient group, such as recipients within the organization, for which the recording, unmodified (e.g., not privatized) may be shared. If the recording is shared with the first recipient group, then the recording may be shared without being privatized. The participant may then select a second recipient group, such as recipients outside of the organization, for which the recording is privatized before sharing. If the recording is shared with the second recipient group, then the recording is privatized and only the privatized recording is shared with the second recipient group.

In some embodiments, the participant may be able to set a privacy timeframe. To set a privacy timeframe, the participant may be able to set an expiration date 515 for privatization rules. For example, the expiration date 515 may indicate a date and time at which the recording should no longer be privatized for a selected recipient group. If the participant inputs Apr. 15, 2023 in the expiration date 515 for recipients outside the meeting list, then anytime the meeting recording is shared with recipients who were not on the meeting list prior to Apr. 15, 2023, then the meeting recording will be privatized and only the privatized recording may be shared with those recipients. After Apr. 15, 2023, however, if the recording is shared, then the recording is no longer privatized and instead the unmodified, non-privatized recording is shared with the recipients outside of the meeting list.

In alternative examples, the privacy timeframe may provide a timeframe for which a recording may be shared without being privatized. In this case, the expiration date 515 may indicate a date at which the recording should be privatized if it is shared with a specified recipient group. For example, if Apr. 15, 2023 is the expiration date 515, then in this example, the recording may be shared as the original recording (e.g., without being privatized) until that date. On or after Apr. 15, 2023, any sharing of the recording may be privatized per the participant's privatization preferences.

In further examples, the expiration date 515 may indicate a date for which the recording may no longer be shared, privatized or not. For example, the participant may indicate that the recording may be shared until Apr. 15, 2023 as a privatized recording. However, on and after Apr. 15, 2023, the recording cannot be shared with a recipient group, regardless if the recording is privatized. The recipient group may include any recipient.

In an example embodiment, the expiration date 515 may instead be a date indicating a change in privatization preferences. For example, the expiration date 515 may indicate a date at which the privatization preferences switch from a first set of preferences to a second set of preferences. During the first privacy timeframe (e.g., prior to the expiration date 515) the first set of preferences may be applied to the recording, while during a second privacy timeframe (e.g., after the expiration date 515), the second set of preferences may be applied to the recording. For example, until Apr. 15, 2023, the participant may set a first set of preferences that includes removing his or her audio streams completely from the recording when the recording is shared with a recipient group. After Apr. 15, 2023, however, the participant may set a second set of preferences that instead modifies his or her audio streams to obfuscate his or her speech characteristics when the recording is shared with the recipient group, instead of removing the audio stream completely.

In some embodiments, the participant can set privatization preferences based on different segments or timing into a recording. For example, the participant may indicate to privatize an introduction segment of a recording, but may indicate that the main segment of the recording may be shared without being privatized. By doing this, the participant may privatize any small talk or colloquial dialogue that is present during the introduction segment of the recording while leaving the main segment of the recording as originally recorded. In some embodiments, the participant may identify the different segments, for example, identifying the introduction segment as occurring between the first 10 minutes of the recording. In other embodiments, recording may be automatically analyzed to identify different segments throughout the recording. The different segments may be identified by topic, speaker, audience, and the like.

In some embodiments, the participant can set additional constraints on sharing of the customized recording by the receiving recipient group. For example, the participant can indicate that the recipient group cannot share the customized recording with a secondary recipient group. For example, if the customized recording is shared via a link to a cloud recording, the link may only allow the identified recipient group to open the customized recording and if the link is shared with a subsequent recipient, then the link may not allow access to the customized recording. In other embodiments, the participant may request notification if the recipient group shares the customized recording. For example, the participant may receive an email or alert if the recipient group shares the customized recording with a subsequent recipient group. In still further embodiments, the participant may receive notification if the recipient group attempts or is successful in removing the customization settings on the customized recording. For example, if the recipient group employs software to remove one or more customization settings that are applied to the customized recording to reveal the original content of the recording, the participant may be notified.

It should be understood that while each of the above examples are discussed individually, the features of each of the examples may be combined in any arrangement. For example, the participant may set an expiration date, along with two different preferences sets for sharing of a recording.

It should be understood that the sharing pane 505 is illustrated in a simplified manner for ease of discussion. Any variety of recipient groups or lists may be provided on the sharing pane 505. In some embodiments, a participant may be able to manually input recipients for which a recording privatization should be performed. For example, in such embodiments, the sharing pane 505 may include an input field to which the participant can type out a recipient's name and/or email address.

The recording privacy preferences prompt 500 may also include a privatization options pane 510. The privatization options pane 510 may include various settings for privatization. For example, as illustrated, the privatization options pane 510 may include settings to privatize the audio stream and/or the video stream in the recording. For example, the settings may include removing the audio stream and/or the video stream from the recording or obfuscating the audio stream and/or the video stream. It should be understood that the privatization options pane 510 is illustrated in a simplified manner and any variety of settings regarding modification of the audio stream, video stream, or other non-audio or video content may be provided.

If a participant selects to obfuscate to privatize his or her video stream in a recording, then one or more personally identifiable objects may be modified in the video stream. For example, the face of a participant may be obfuscated, such as by blurring, to minimize the visual personally identifiable traits of the participant. As depicted by the video stream for the participant 435c, in some embodiments, the video stream may be modified to completely remove any trace of the participant 435c pursuant to a recording privacy request. In still further embodiments, the video stream may be replaced with a picture or icon pursuant to a personal privacy request, such as is illustrated for the participant 435d.

Privatization of a video stream may, in some embodiments, remove or obfuscate personally identifiable objects in the background of the video stream. For example, the participant may be okay with being visible in the video stream, however, he or she may wish to obfuscate personally identifiable objects in his or her background. The participant may have a bookshelf in his or her background that has family pictures on the shelves. As such, the participant may indicate to obfuscate personally identifiable objects, including the family pictures, in his or her video stream. Based on this request, the recording privacy function may identify the personally identifiable objects in the participant's background and obfuscate them. For example, the recording privacy function may blur the family pictures or may replace the images in the family pictures to landscape scenes. In another example, the personally identifiable objects may be books on a bookshelf In such an example, the participant may be an attorney and have a bookshelf full of law school books. The participant may not wish to be identified as an attorney if the recording is shared. As such, the participant may request to privatize the video stream background when the meeting is shared outside of the meeting participant list. Based on this request, the recording privacy function may identify the titles of the books on the bookshelf that are viewable in the background and blur or otherwise modify the titles.

The identification and obfuscation of the personally identifiable objects may be determined by the participant and/or the video conference provider 310. For example, the participant may select in his or her recording privacy preferences to blur his or her face. Then, based on this selection, the video conference provider 310 may use known techniques to identify the participant's face in the video stream and blur the participant's face. In other embodiments, the participant may only select in his or her recording privacy preferences to remove personally identifiable objects in his or her video stream. Based on this selection, the video conference provider 310 may determine which objects in the video stream are personally identifiable and remove or obfuscate the objects using known techniques, such as for example known machine learning techniques. The participant may have granular control over indicating what objects should be classified as personally identifiable. For example, the participant may indicate in his or her recording privacy preferences that any face or person identified in the stream, live or in a photo, should be classified as personally identifiable. In another example, the participant may indicate that titles of books or documents visible in his or her video stream should be classified as personally identifiable. In this manner, the participant may have control over the level or degree to which personally identifiable information is shared via his or her video stream.

If a participant selects to obfuscate to privatize his or her audio stream, then one or more personally identifiable characteristics of a participant's audio stream may be modified. For example, the participant may speak with a personally identifiable speech intonation. Based on this intonation alone, people may be able to identify the participant or identify characteristics of the participant (e.g., southern drawl). As such, the participant may request to privatize his or her audio stream when the recording is shared. Other audible characteristics that may be modified based on a recording privacy request may include speech pitch, speech pattern, accent, and speech vocabulary. Certain terms or set of vocabulary may be personally identifiable to a participant. For example, words may be indicative of an accent or location associated with a participant. The terms "loo" or "quid" may be immediately identifiable with a British accent or location. As such, the recording privacy function may identify these terms and modify them in a participant's audio stream to a more neutral term, such as "bathroom" or "currency" when the meeting recording is shared.

Once a participant makes his or her selections on the recording privacy preferences prompt 500, the participant may select selection 520. The selection 520 may apply the recording privacy preferences to a recording or to all recordings moving forward. The application of the recording privacy preferences may vary.

Figure 6:
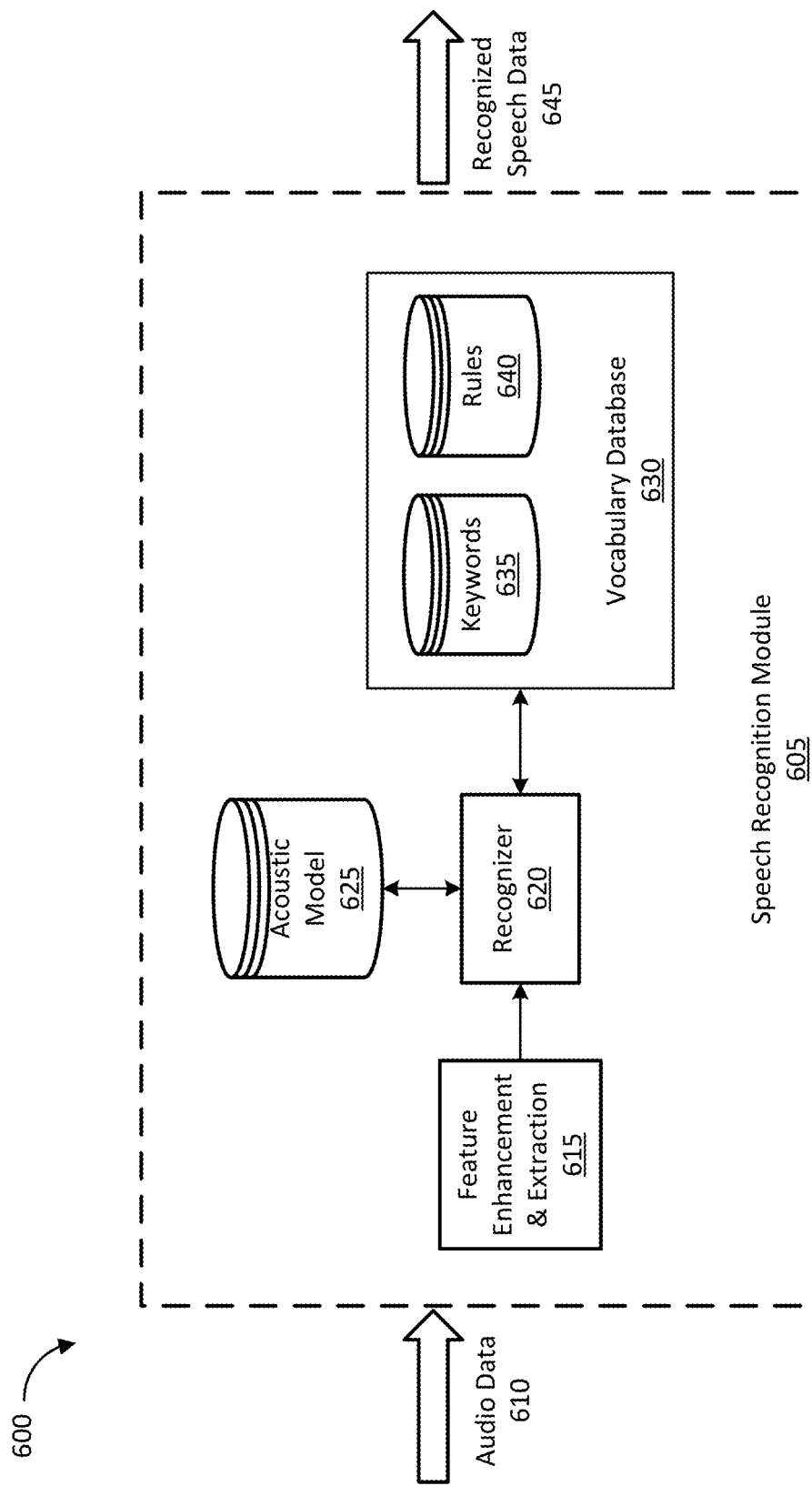
FIG. 6 illustrates an example speech recognition system that may be locally or remotely executed, according to an embodiment herein.

Turning now to FIG. 6, an example speech recognition system 600 that may be used to privatize an audio stream within a recording is provided. The speech recognition system 600 may be executed locally or remotely. For example, the speech recognition system 600 may be locally executed on a client device, such as the client device 340a, however, in other embodiments, the speech recognition system 600 may be cloud-based and/or remotely executed by a video conference provider, such as the video conference provider 310, or a third party system.

Figure 7:
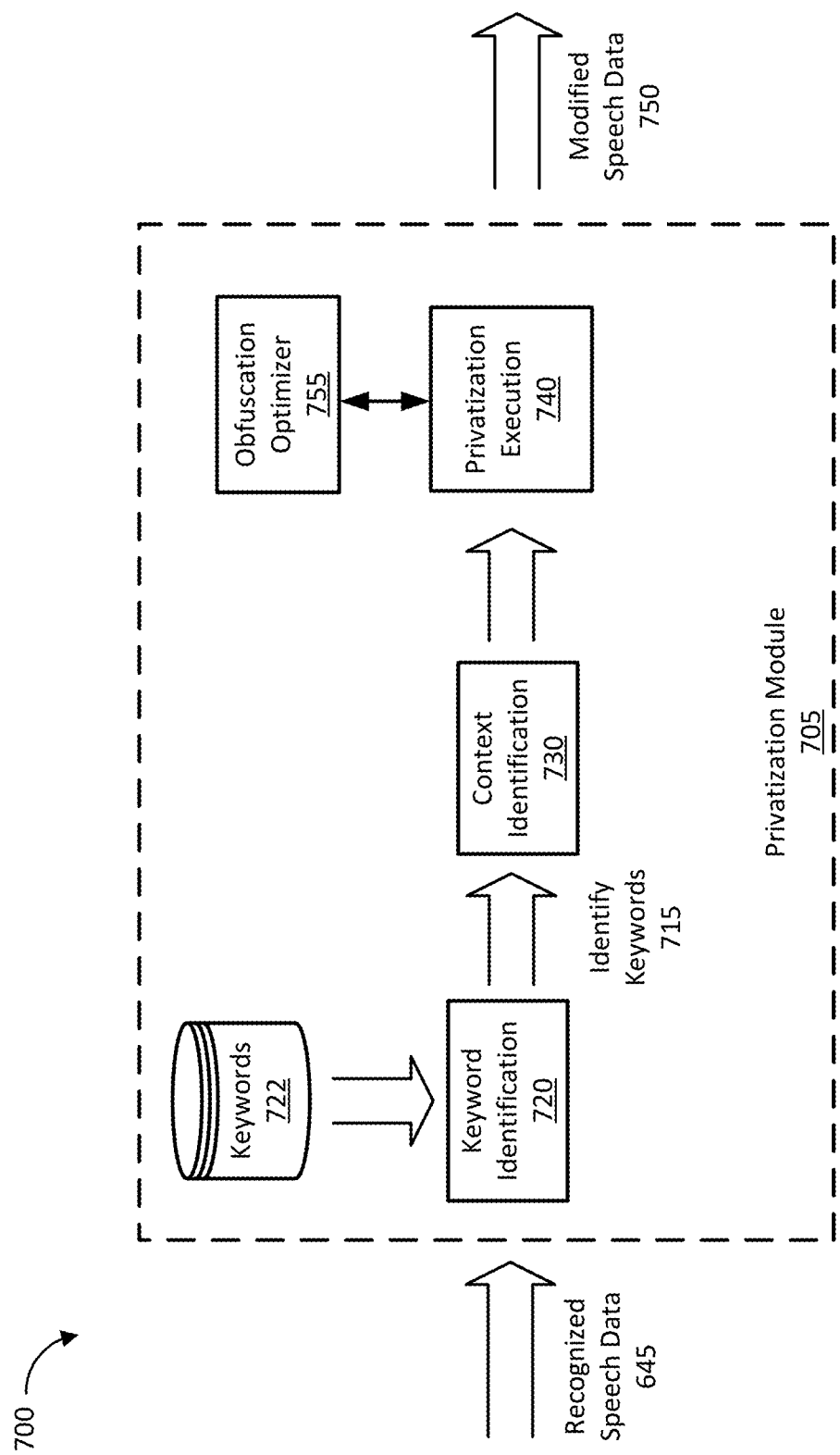
FIG. 7 illustrates an example privatization system that may be locally or remotely executed, according to an embodiment herein.

The speech recognition system 600, along with a privatization system 700 described in greater detail with respect to FIG. 7, may be used to perform a variety of recording privacy functions. For example, in some embodiments, the speech recognition system 600 may be used to perform recording privatization on a participant's audio stream in response to a recording privacy request from that participant. In other embodiments, the speech recognition system 600 may be used to identify personally identifiable information relating to a participant in the audio streams from the other meeting participants (e.g., remove references to the privatized participant made by the other participants) within the recording. In still further embodiments, the speech recognition system 600 may be used to process the audio streams to generate a transcript of the meeting.

To perform speech recognition, the speech recognition system 600 may include a speech recognition module 605. The speech recognition module 605 may receive audio data 610. The audio data 610 may correspond to audio captured by the client device 340a, for example by a microphone. In other embodiments, the audio data 610 may be received from the video conference provider 310. The audio data 610 may be a recording of an audio stream or may be a transcript of the audio stream. The speech recognition module 605 may be or include a speech recognition system or model as known in the art. The following is an example speech recognition module following an example speech recognition process, however, it should be understood that other speech recognition modules or processes may be used.

Once the audio data 610 is received by the speech recognition module 605, the audio data 610 may be processed by a feature enhancement and extraction module 615. The feature enhancement and extraction module 615 may analyze the audio data for features corresponding to words and then enhance and extract any identified features. The identified features may correspond to audio waveforms present in human speech.

The speech recognition module 605 may also include a recognizer 620. The recognizer 620 may receive the identified features from the audio data 610. The recognizer 620 may employ an acoustic model 625 and a vocabulary database 630 to determine or associate the identified features in the audio data 610 to one or more words.

In an example embodiment, the acoustic model 625 may analyze the raw audio waveforms in the identified features and determine a corresponding phoneme for each waveform. In some embodiments, this is performed at the character or subword level. The vocabulary database 630 may be a language model. The vocabulary database 630 may include a rules database 640 and a word database 635. The rules database 640 may provide various rules for speech, allowing the recognizer to discard any association of identified features (e.g., audio waveforms) to phonemes that are improbable given the constraints of proper grammar and the topic of discussion. Once an appropriate mapping of the identified features to phonemes is generated, the recognizer 620 may determine words associated with the phonemes. The words may be based on the words database 635.

Once the phonemes are associated with respective words, recognized speech data 645 is generated. It should be understood that this process may be performed nearly instantaneously. For example, the speech recognition module 605 may generate the recognized speech data 645 during the meeting as the audio streams are being received by the video conference provider 310 or another system that is hosting the speech recognition system 600.

The recognized speech 645 may be then used to perform one or more recording privacy functions, such as privatizing an audio stream or recognizing personally identifiable information corresponding to a participant in the audio streams. Turning now to FIG. 7, a privatization system 700 is provided. The privatization system 700 may include privatization module 705 that is used to perform one or more of the privatization functions described herein. For example, in one case, the recognized speech 645 may be received from the speech recognition system 600 to privatize the associated audio stream.

The recognized speech 645 may be received by the keyword identification system 720. The keyword identification system 720 may identify one or more keywords in the recognized speech data 745. The database of known keywords 722 may be queried to identify any keywords in the stream of recognized speech data 645. Keywords in the keyword database 722 may be based on the participant for which the recording privacy functionality is being invoked. For example, if the recording privacy functionality is invoked for the client device 340a, then the keywords in the keyword database 722 may relate to or be based on participant A, who corresponds to the client device 340a. The keywords may include words relating to the identity of participant A or personally identifiable information about participant A, such as the first and last name of participant A. In some cases, the keywords may include an office or location of participant A. Other keywords may include the names of projects, areas, or topics that participant A is involved in. In some embodiments, keywords may include one or more emotion expressions, such as a distinct laughter, or identifiable speech characteristics, such as an accent.

The keywords in the keyword database 722 may be gathered from participant A or from the client device 340a. For example, upon enabling the recording privacy functionality, participant A may be prompted to input personally identifiable keywords that the privatization module 705 should monitor the virtual meeting for (e.g., nickname). In other embodiments, the privatization module 705 may receive some or all the keywords from the participant's profile with the video conference provider 310. In still other embodiments, the privatization module 705 may gather keywords from applications on the client device 340a. If the privatization module 705 has permission to search other applications on the client device 340a, the privatization module 705 may gather keywords from folders, calendars, emails, or other applications running on the client device 340a.

It should be understood that a keyword may include more than one word. For example, "Project Alpha" may be a "keyword" as indicating that the phrase "Project Alpha" is a personally identifiable characteristic for participant A. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "look for," "looking for," and "looked for." In some examples each of these may be a distinct keyword, while in other examples, the variants may be associated with a base term, e.g., "look," that is used as the keyword. However, any suitable approach to recognizing keywords may be used.

If one or more keywords 715 is recognized, the privatization module 705 then may identify a context 730 associated with the keyword 715. In this example, to identify a context, the privatization module 705 may employ a trained machine learning ("ML") technique to semantically analyze the speech or transcript associated with the identified keyword 715 to determine additional related keywords and/or descriptors. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

The ML technique may receive the sequence of words and determine whether the words correspond to a participant. For example, in an example embodiment where the recording privacy function is requested by a participant to remove any reference to the participant in the recording, the ML technique may semantically analyze the words of a given audio stream and determine whether any of the words are referencing Participant A. For example, if Participant A is located in the Denver office, the ML technique may semantically analyze the audio stream to determine whether the speaker is intending to refer to Participant A by stating "he likes John Denver." The ML technique may determine that the statement that "he likes John Denver" is not referring to Participant A because the reference is not to the Denver location, but instead to the singer, John Denver.

While ML techniques may be employed in some examples, in other examples the context identification 730 functionality may perform a word search to identify words or phrases associated with a recording privacy request within a predetermined number of words from the identified keyword(s) 715. For example, considering the example above where the speaker says "Denver," the context identification may perform a search for certain words preceding "Denver", such as "city," "office," "work," etc. If one of those words is found preceding "Denver" within a predetermined number of words, the context identification 730 functionality may determine that the term "Denver" was meant to reference to Participant A who has an office located in Denver.

Since people may use jargon or colloquial terms to refer to particular actions, the context identification 730 functionality may normalize recognized words to specific meanings. For example, the terms "confidential," "private," "between you and me," "on the down low," etc. all refer to keeping information undisclosed. Thus, the context identification 730 functionality may map such terms to have a single meaning (e.g., private). Such mappings may be provided for multiple different phrases and corresponding terms. Similarly, synonyms or words related to keywords may also be identified.

Once the context identification 730 has identified the one or more keywords 715 and identified the context of the identified keywords 715, the privatization module 705 may perform a recording privacy execution 740. The privatization module 705 may determine, based on the identification of the keywords 715, and the context of the keywords, that the keywords are referring to Participant A. The recording privacy execution 740 may communicate with the video conferencing software to start modifying the requested content (e.g., audio stream and/or video stream) based on identifying the keywords. For example, upon identifying the keywords referencing the Participant A, the video conference provider may modify the keywords to more neutral terms or completely remove the keywords from the audio streams, depending on Participant A's recording privacy preferences.

As noted above, in some embodiments, the speech recognition system 600 and the privatization system 700 may be used to privatize an audio stream for a participant, such as Participant A. In such examples, the audio data from the audio stream may be modified such to change personally identifiable characteristics of the participant's speech. To modify the audio data, an obfuscation optimizer 755 may be applied to the recognized speech data 645, including the identified keywords 715. The obfuscation optimizer 755 may modify one or more speech characteristics identified in the recognized speech data 645 and/or the keywords 715 to obfuscate any personally identifiable information. For example, the obfuscation optimizer 755 may modify a speech pattern or speech pitch of the recognized speech data 645. In some embodiments, the obfuscation optimizer 755 may randomly modify the identified speech characteristic, while in other embodiments the obfuscation optimizer 755 may use an optimization algorithm to optimize the obfuscation. Optimization of speech characteristic obfuscation may include modifying the speech characteristic such that the modification is untraceable or not reversible. In some embodiments, the obfuscation optimizer 755 may use a neural network model to maximize the difference between the original content and the modified content. Optimization of the speech characteristic obfuscation may also include modifying the speech characteristic to a contrasting point. For example, if the speech characteristic is for high pitch speech, then optimization may include modifying the speech characteristic to low pitch speech.

In some embodiments, the obfuscation optimizer 755 may modify the vocabulary of the recognized speech data 645. For example, using the keywords 715 the obfuscation optimizer 755 may modify or change personally identifiable vocabulary in the recognized speech data 645 to neutral terms. Following the example provided above, if the keywords 715 include the term "quid" and "quid" is determined to be personally identifiable to the privatized participant because it indicates a British component to the participant, then the obfuscation optimizer 755 may change the term "quid" in the recognized speech data 345 to a more neutral synonym, such as for example, "currency," "money," or "dollar."

In another embodiment, the obfuscation optimizer 755 may identify references to Participant A's name and modify the reference to a neutral name. For example, if Participant A is addressed by his name "Christopher," then the obfuscation optimizer 755 may identify the name "Christopher" and modify it to another name, such as for example "James." In some embodiments, the obfuscation optimizer 755 may query a nickname database (not shown) to be able to identify a nickname used for Participant A. For example, if Participant A is addressed "Chris" then the obfuscation optimizer 755 may identify "Chris" as referring to Participant A. In some embodiments, the obfuscation optimizer 755 may use machine learning to identify nicknames. The machine learning may gather data based on which participant responds when a nickname is spoken. Nicknames identified by the machine learning algorithm may be added to a nickname database.

After privatizing the recognized speech data 645, the privatization module 705 may transmit the modified speech data 750 to the video conference provider 310. The video conference provider 310 may generate a privatized recording in which the audio data is modified based on the modified speech data 750. Again, the modified speech data 750 could be for Participant A (e.g., the participant requesting the recording privacy) or the modified speech data 750 could be for audio data from other participants (e.g., other participants are referencing Participant A).

In some embodiments, the privatization 700 may be used to generate a transcript and/or edit a transcript of the meeting recording. When a participant requests to privatizing a meeting recording upon sharing, any transcript generated of the privatized recording may be privatized as well. For example, any personally identifiable content within the transcript, including transcription of other participants' audio streams (e.g., another participant addressed the privatized participant by name) may be modified or removed to remove personally identifiable characteristics of the requesting participant in a modified transcript. In an example embodiment, the transcript may be analyzed and any personally identifiable content in the transcription corresponding to the privatized participant's audio stream may be modified or removed in the transcript or any reference to the privatized participant may be modified or removed in the transcript. In such example embodiments, the privatization 700 may identify and remove any personally identifiable information corresponding to participant A. For example, the keyword identification 720 and the context identification 730 may be used to identify keywords and context within a transcript that correspond to personally identifiable information of Participant A. Once identified, the privatization system 700 may remove the personally identifiable content from the transcript to generate a modified transcript.

Figure 8:
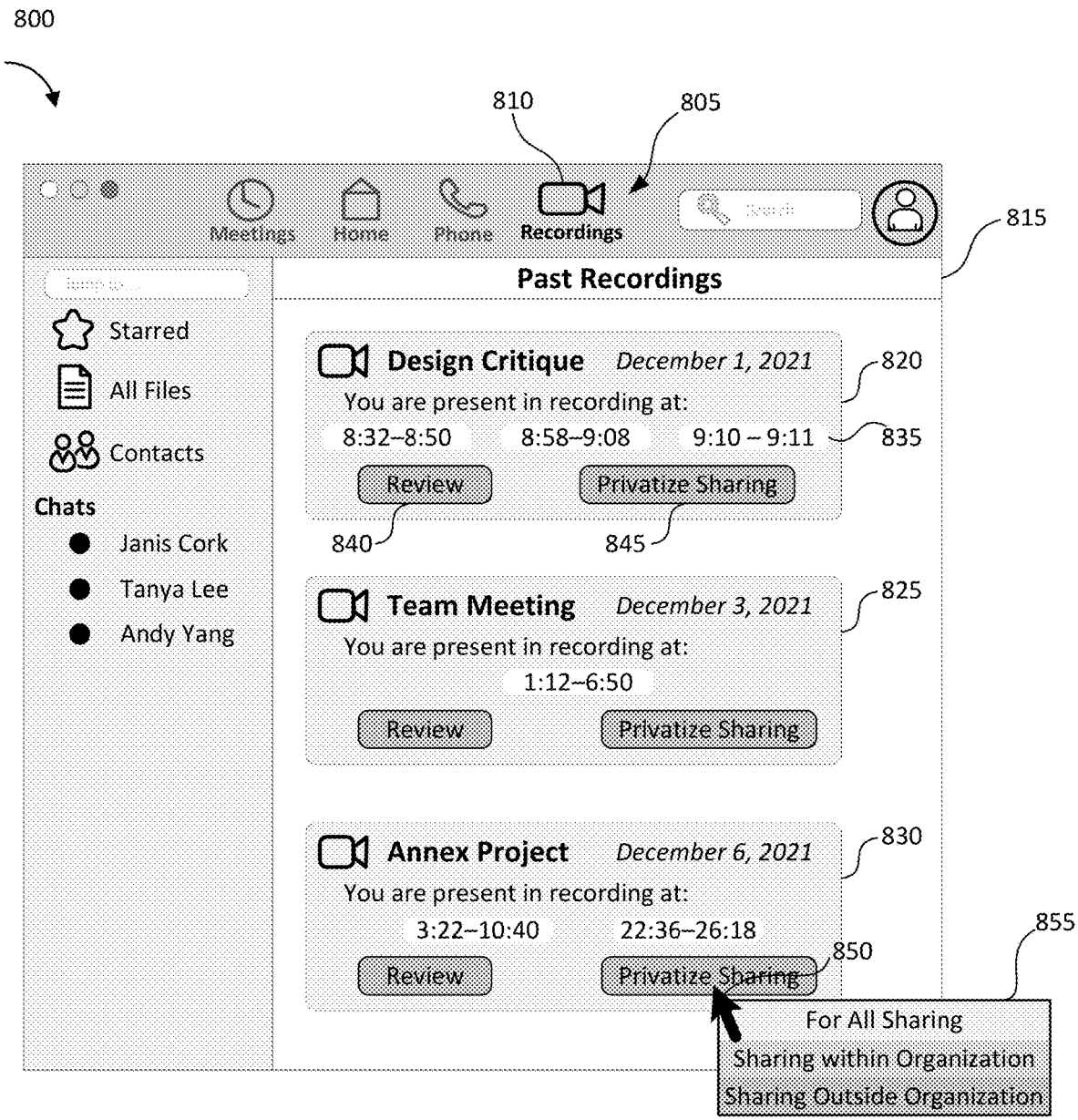
FIG. 8 illustrates a graphical user interface showing a listing of past recordings involving a participant, according to an embodiment herein.

Turning now to FIG. 8, a GUI 800 showing a listing of past recordings 815 involving a participant is provided, according to an embodiment. As noted above, in some embodiments, a participant may be able to privatize past recordings for sharing purposes. For example, as illustrated, a participant may be able to view past recordings 815. The past recordings 815 may be recordings of meetings in which the participant was involved. As such, the participant may be present in each of the past recordings 815.

As shown, the past recordings 815 may be provided to a participant upon selection of a recordings selection 810 on the GUI dashboard 805. Upon selecting the recordings selection 810, the GUI 800 may provide a listing of past recordings 815 in which the participant is present. For example, the past recordings 815 may include a first recording 820, a second recording 825, and a third recording 830. In each of the recordings 820, 825, and 830, the participant may be present, such as for example, in an audio stream and/or video stream. To assist the participant in reviewing the past recordings 815 for privatization purposes, each of the recordings 820, 825, and 830 may include a presence time indication 835. The presence time indication 835 may provide a time into the recording at which presence of the participant is detected. For example, the presence time indication 835 may indicate a time into the recording that the participant is speaking, displaying his or her video stream, or is referenced by another meeting participant.

Each of the recordings 820, 825, and 830 may include a review selection 840. The review selection 840 may play the recording segments corresponding to the presence time indication 835. This may allow for a quick review of the recordings 820, 825, and 830 by providing only the segments of the recording in which the participant's presence is identified.

Upon reviewing a segment recording, the participant may determine that he or she would like to privatize those segments or the entire recording when shared with a particular recipient group. To submit a recording privacy request, the participant may select a privatize sharing selection 845. The privatize sharing selection 845 may be the same or similar to the privatize recording selection 445. For example, a participant may select the privatize sharing selection 845 with his or her cursor 850. In response to the selection, a prompt 855 may be provided. The prompt 855 may provide various options with respect to privatizing the recording for various recipients. For example, as illustrated, the prompt 855 may provide an option to privatize the recording when shared with recipients outside the organization, when shared with recipients within the organization, or anytime the recording is shared. As noted above, the recordings 820, 825, and 830 may be privatized according to the participant's recording privacy preferences.

Figure 9:
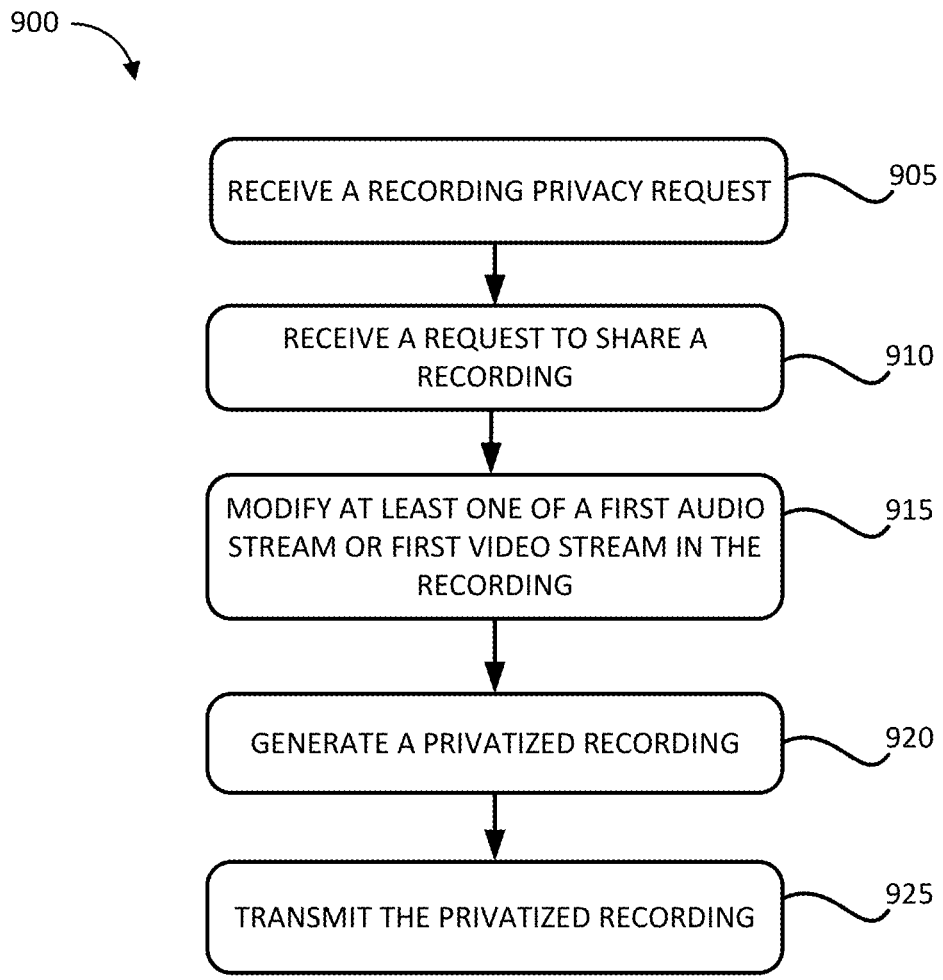
FIG. 9 depict an exemplary method for enforcing consent requirements for sharing virtual meeting recordings, according to an embodiment herein.

Referring now to FIG. 9, a flowchart of an example method 9000 for enforcing consent requirements for sharing virtual meeting recordings is provided. The description of the method 900 in FIG. 9 will be made with reference to FIGS. 3-8, however any suitable system according to this disclosure may be used, such as the example systems 100 and 200, shown in FIGS. 1 and 2.

The method 900 may include step 905. At step 905, the method 900 may include receiving, from a first client device, a recording privacy request associated with a virtual meeting. For example, the participant client device 340a may transmit a recording privacy request to the video conference provider 310. The recording privacy request may be made prior to a virtual meeting, during a virtual meeting, or after a virtual meeting. The recording privacy request may indicate the participant's recording privacy preferences for a recording associated with a virtual meeting.

The method 900 may also include step 910. At step 910, a request to share a recording of the virtual meeting with one or more recipients may be received from a second client device. For example, the participant client device 340b may request to share a recording associated with a virtual meeting that the participant client device 340a and the participant client device 340b participated in with one or more recipients. The request to share the recording may be received by the video conference provider 310.

At step 915, the method 900 may include modifying at least one of a first audio stream or a first video stream associated with the first client device in the recording based on the recording privacy request. For example, the video conference provider 310 may modify at least one of the first audio stream or the first video stream associated with the participant client device 340a based on the recording privacy request received from the participant client device 340a. As described in the above description, the recording may include the first audio stream and/or the first video stream from the participant client device 340a. The participant client device 340a may indicate, via the recording privacy request, to modify the first audio and/or video streams in the recording based on his or her recording privacy preferences. For example, the participant may indicate to obfuscate one or more personally-identifiable characteristics the first audio stream, such as for example, the participant's speech intonation, speech pitch, speech pattern, or speech vocabulary, and/or to obfuscate one or more personally identifiable objects in the first video stream, such as for example, blurring a face of a first participant associated with the first client device in the first video stream. The modification to the first audio and/or video stream may be based on an identity of the one or more recipients.

The method 900 may also include generating a privatized recording based on the modification of the at least one of the first audio stream or the first video stream at step 920. For example, the video conference provider 310 may modify the first audio and/or video streams and then generate a privatized recording including the modification to the respective streams. In some embodiments, the method may include storing the recording of the virtual meeting by the video conference provider. The recording may be stored as including at least one of the first audio stream or the first video stream as unmodified.

Figure 10:
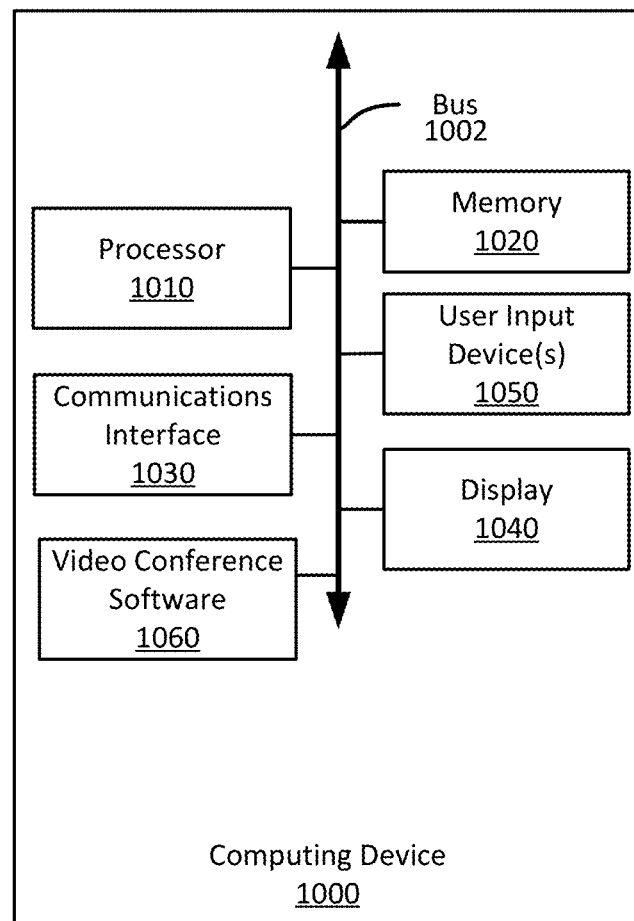
FIG. 10 shows an example computing device suitable for enforcing consent requirements for sharing virtual meeting recordings, according to this disclosure.

The method 900 may also include step 925. At step 925, the method 900 may include transmitting, by the video conference provider, the privatized recording to the one or more recipients. For example, the video conference provider 310 may transmit the privatized recording to the one or more participants during a privacy timeframe. In such examples, the video conference provider 310 may also determine an end time based on the privacy timeframe and after the end time occurs, transmit the recording including the first audio stream and/or the first video stream unmodified to the one or more recipients Referring now to FIG. 10, FIG. 10 shows an example computing device 1000 suitable for use in example systems or methods for enforcing consent requirements for sharing virtual meeting recordings. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for enforcing consent requirements for sharing virtual meeting recordings, such as part or all of the example method 900, described above with respect to FIG. 9. The computing device, in this example, also includes one or more user input devices 1050, such as a keyboard, mouse, touchscreen, video input device (e.g., one or more cameras), microphone, etc., to accept user input. The computing device 1000 also includes a display 1040 to provide visual output to a user.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, from a first client device, a recording privacy request associated with a virtual meeting; receive, from a second client device, a request to share a recording of the virtual meeting with one or more recipients, wherein the first client device and the second client device participate in the virtual meeting; modify at least one of a first audio stream or a first video stream associated with the first client device in the recording based on the recording privacy request; generate a privatized recording based on the modification of at least one of the first audio stream or the first video stream; and transmit, to the one or more recipients, the privatized recording.

Example 2 is the system of any previous or subsequent example, wherein the processor is configured to execute further processor-executable instructions stored in the non-transitory computer-readable medium to: determine one or more privatization preferences based on an identity of the one or more recipients; and modify, based on the identity of the one or more recipients, at least one of the first audio or the first video stream associated with the first client device in the recording.

Example 3 is the system of any previous or subsequent example, wherein the processor-executable instructions to modify the first video stream associated with the first client device in the recording further cause the processor to execute further processor-executable instructions stored in the non-transitory computer-readable medium to: obfuscate one or more objects in the first video stream of the privatized recording.

Example 4 is the system of any previous or subsequent example, wherein the processor-executable instructions to modify at least one of the first audio stream or the first video stream associated with the first client device in the recording further cause the processor to execute further processor-executable instructions stored in the non-transitory computer-readable medium to: erase at least a portion of the first audio stream from the recording, and generate the privatized recording without at least the portion of the first audio stream.

Example 5 is the system of any previous or subsequent example, wherein the processor-executable instructions to modify at least one of the first audio stream or the first video stream associated with the first client device in the recording further cause the processor to execute further processor-executable instructions stored in the non-transitory computer-readable medium to: modify the first audio stream to change at least one characteristic of the first audio stream, wherein at least one characteristic of the first audio stream comprises at least one of: speech intonation; speech pitch; speech pattern; or speech vocabulary.

Example 6 is the system of any previous or subsequent example, wherein the processor-executable instructions to modify at least one of the first audio stream or the first video stream associated with the first client device in the recording further cause the processor to execute further processor-executable instructions stored in the non-transitory computer-readable medium to: erasing the first video stream associated with the first client device in the recording.

Example 7 is the system of any previous or subsequent example, wherein the processor is configured to execute further processor-executable instructions stored in the non-transitory computer-readable medium to: determine a timeframe since the recording was generated; determine, based on the timeframe, one or more privatization preferences associated with the recording privacy request; and modify at least one of the first audio stream or the first video stream based on the one or more privatization preferences.

Example 8 is a method comprising: receiving, from a first client device, a recording privacy request associated with a virtual meeting; receiving, from a second client device, a request to share a recording of the virtual meeting with one or more recipients, wherein the first client device and the second client device participate in the virtual meeting; modifying, by a video conference provider, at least one of a first audio stream or a first video stream associated with the first client device in the recording based on the recording privacy request; generating, by the video conference provider, a privatized recording based on the modification of at least one of the first audio stream or the first video stream; and transmitting, by the video conference provider, the privatized recording to the one or more recipients.

Example 9 is the method of any previous or subsequent example, wherein modifying, by the video conference provider, at least one of the first audio stream or the first video stream associated with the first client device comprises: modifying, by the video conference provider, the first audio stream based on an identity of the one or more recipients.

Example 10 is the method of any previous or subsequent example, the method further comprising: storing, by the video conference provider, the recording of the virtual meeting, wherein the recording comprises at least one of the first audio stream or the first video stream unmodified.

Example 11 is the method of any previous or subsequent example, wherein generating, by the video conference provider, the privatized recording comprises: obfuscating, by the video conference provider, one or more personally-identifiable characteristics of the first audio stream within the privatized recording; and obfuscating by the video conference provider, one or more personally-identifiable objects in the first video stream within the privatized recording.

Example 12 is the method of any previous or subsequent example, wherein obfuscating, by the video conference provider, the one or more personally-identifiable objects in the first video stream comprises: blurring a face of a first participant associated with the first client device in first video stream within the privatized recording.

Example 13 is the method of any previous or subsequent example, wherein obfuscating, by the video conference provider, the one or more personally-identifiable characteristics of the first audio stream comprises: modifying at least one of: a speaker's intonation; a speaker's pitch; a speaker's speech pattern; or a speaker's vocabulary.

Example 14 is the method of any previous or subsequent example, wherein transmitting, by the video conference provider, the privatized recording to the one or more recipients comprises: transmitting, by the video conference provider, the privatized recording to the one or more recipients during a privacy timeframe; determining, by the video conference provider, an end time based on the privacy timeframe; and after the end time, transmitting, by the video conference provider, the recording to the one or more recipients, wherein the recording comprises the first audio stream unmodified.

Example 15 is a non-transitory computer-readable medium comprising processor-executable instructions configured to cause one or more processors to: receive, from a first client device, a recording privacy request associated with a virtual meeting; receive, from a second client device, a request to share a recording of the virtual meeting with one or more recipients, wherein the first client device and the second client device participate in the virtual meeting; modify at least one of a first audio stream or a first video stream associated with the first client device in the recording based on the recording privacy request to generate a privatized recording; generate a privatized recording based on modifying at least one of the first audio stream or the first video stream; and transmit, to the one or more recipients, the privatized recording.

Example 16 is the non-transitory computer-readable medium of any previous or subsequent example, wherein the one or more processors are configured to execute further processor-executable instructions stored in the non-transitory computer-readable medium to: perform speech recognition on the first audio stream.

Example 17 is the non-transitory computer-readable medium of any previous or subsequent example, wherein the one or more processors are configured to execute further processor-executable instructions stored in the non-transitory computer-readable medium to: determine, based on the speech recognition performed on the first audio stream, a speech pattern; and modify the first audio stream to change the speech pattern.

Example 18 is the non-transitory computer-readable medium of any previous or subsequent example, wherein the one or more processors are configured to execute further processor-executable instructions stored in the non-transitory computer-readable medium to: generate, based in part on the speech recognition, a transcript of a plurality of audio streams in the recording, wherein the plurality of audio streams comprise the first audio stream; and responsive to a request to share the transcript, remove, from the transcript, transcription of the first audio stream.

Example 19 is the non-transitory computer-readable medium of any previous or subsequent example, wherein the one or more processors are configured to execute further processor-executable instructions stored in the non-transitory computer-readable medium to: provide, to the first client device, a listing of one or more previous recordings associated with the first client device.

Example 20 is the non-transitory computer-readable medium of any previous or subsequent example, wherein the one or more processors are configured to execute further processor-executable instructions stored in the non-transitory computer-readable medium to: provide, to the first client device, a replay of at least one of the first audio stream or the first video stream as modified in the privatized recording.

That which is claimed is:

1. A system comprising:
   a non-transitory computer-readable medium;
   a communications interface; and
   a processor communicatively coupled to the non-transitory computer-readable medium and the communications interface, the processor configured to execute processor-executable instructions stored in the non-transitory computer-readable medium to:
      receive, from a first client device, a recording privacy request associated with a virtual meeting;
      receive, from a second client device, a request to share a recording of the virtual meeting with one or more recipients, wherein the first client device and the second client device participate in the virtual meeting;
      modify at least one of a first audio stream or a first video stream associated with the first client device in the recording based on the recording privacy request;
      generate a privatized recording based on the modification of at least one of the first audio stream or the first video stream; and
      transmit, to the one or more recipients, the privatized recording.

2. The system of claim 1, wherein the processor is configured to execute further processor-executable instructions stored in the non-transitory computer-readable medium to:
   determine one or more privatization preferences based on an identity of the one or more recipients; and
   modify, based on the identity of the one or more recipients, at least one of the first audio or the first video stream associated with the first client device in the recording.

3. The system of claim 1, wherein the processor-executable instructions to modify the first video stream associated with the first client device in the recording further cause the processor to execute further processor-executable instructions stored in the non-transitory computer-readable medium to:
   obfuscate one or more objects in the first video stream of the privatized recording.

4. The system of claim 1, wherein the processor-executable instructions to modify at least one of the first audio stream or the first video stream associated with the first client device in the recording further cause the processor to execute further processor-executable instructions stored in the non-transitory computer-readable medium to:
   erase at least a portion of the first audio stream from the recording, and
   generate the privatized recording without at least the portion of the first audio stream.

5. The system of claim 1, wherein the processor-executable instructions to modify at least one of the first audio stream or the first video stream associated with the first client device in the recording further cause the processor to execute further processor-executable instructions stored in the non-transitory computer-readable medium to:
   modify the first audio stream to change at least one characteristic of the first audio stream, wherein at least one characteristic of the first audio stream comprises at least one of:
   speech intonation;
   speech pitch;
   speech pattern; or
   speech vocabulary.

6. The system of claim 1, wherein the processor-executable instructions to modify at least one of the first audio stream or the first video stream associated with the first client device in the recording further cause the processor to execute further processor-executable instructions stored in the non-transitory computer-readable medium to:
   erasing the first video stream associated with the first client device in the recording.

7. The system of claim 1, wherein the processor is configured to execute further processor-executable instructions stored in the non-transitory computer-readable medium to:
   determine a timeframe since the recording was generated;
   determine, based on the timeframe, one or more privatization preferences associated with the recording privacy request; and
   modify at least one of the first audio stream or the first video stream based on the one or more privatization preferences.

8. A method comprising:
   receiving, from a first client device, a recording privacy request associated with a virtual meeting;
   receiving, from a second client device, a request to share a recording of the virtual meeting with one or more recipients, wherein the first client device and the second client device participate in the virtual meeting;
   modifying, by a video conference provider, at least one of a first audio stream or a first video stream associated with the first client device in the recording based on the recording privacy request;
   generating, by the video conference provider, a privatized recording based on the modification of at least one of the first audio stream or the first video stream; and
   transmitting, by the video conference provider, the privatized recording to the one or more recipients.

9. The method of claim 8, wherein modifying, by the video conference provider, at least one of the first audio stream or the first video stream associated with the first client device comprises:
   modifying, by the video conference provider, the first audio stream based on an identity of the one or more recipients.

10. The method of claim 8, the method further comprising:
   storing, by the video conference provider, the recording of the virtual meeting, wherein the recording comprises at least one of the first audio stream or the first video stream unmodified.

11. The method of claim 8, wherein generating, by the video conference provider, the privatized recording comprises:
   obfuscating, by the video conference provider, one or more personally-identifiable characteristics of the first audio stream within the privatized recording; and
   obfuscating by the video conference provider, one or more personally-identifiable objects in the first video stream within the privatized recording.

12. The method of claim 11, wherein obfuscating, by the video conference provider, the one or more personally-identifiable objects in the first video stream comprises:
   blurring a face of a first participant associated with the first client device in first video stream within the privatized recording.

13. The method of claim 11, wherein obfuscating, by the video conference provider, the one or more personally-identifiable characteristics of the first audio stream comprises:
   modifying at least one of:
   a speaker's intonation;
   a speaker's pitch;
   a speaker's speech pattern; or
   a speaker's vocabulary.

14. The method of claim 8, wherein transmitting, by the video conference provider, the privatized recording to the one or more recipients comprises:
   transmitting, by the video conference provider, the privatized recording to the one or more recipients during a privacy timeframe;
   determining, by the video conference provider, an end time based on the privacy timeframe; and
   after the end time, transmitting, by the video conference provider, the recording to the one or more recipients, wherein the recording comprises the first audio stream unmodified.

15. A non-transitory computer-readable medium comprising processor-executable instructions configured to cause one or more processors to:
   receive, from a first client device, a recording privacy request associated with a virtual meeting;
   receive, from a second client device, a request to share a recording of the virtual meeting with one or more recipients, wherein the first client device and the second client device participate in the virtual meeting;
   modify at least one of a first audio stream or a first video stream associated with the first client device in the recording based on the recording privacy request to generate a privatized recording;
   generate a privatized recording based on modifying at least one of the first audio stream or the first video stream; and
   transmit, to the one or more recipients, the privatized recording.

16. The non-transitory computer-readable medium of claim 15, wherein the one or more processors are configured to execute further processor-executable instructions stored in the non-transitory computer-readable medium to:
   perform speech recognition on the first audio stream.

17. The non-transitory computer-readable medium of claim 16, wherein the one or more processors are configured to execute further processor-executable instructions stored in the non-transitory computer-readable medium to:
   determine, based on the speech recognition performed on the first audio stream, a speech pattern; and
   modify the first audio stream to change the speech pattern.

18. The non-transitory computer-readable medium of claim 16, wherein the one or more processors are configured to execute further processor-executable instructions stored in the non-transitory computer-readable medium to:
   generate, based in part on the speech recognition, a transcript of a plurality of audio streams in the recording, wherein the plurality of audio streams comprise the first audio stream; and
   responsive to a request to share the transcript, remove, from the transcript, transcription of the first audio stream.

19. The non-transitory computer-readable medium of claim 16, wherein the one or more processors are configured to execute further processor-executable instructions stored in the non-transitory computer-readable medium to:
   provide, to the first client device, a listing of one or more previous recordings associated with the first client device.

20. The non-transitory computer-readable medium of claim 15, wherein the one or more processors are configured to execute further processor-executable instructions stored in the non-transitory computer-readable medium to:
   provide, to the first client device, a replay of at least one of the first audio stream or the first video stream as modified in the privatized recording.

* * * * *